United States Patent [19]

Fair

[11] 4,334,592
[45] Jun. 15, 1982

[54] SEA WATER HYDRAULIC FLUID SYSTEM FOR AN UNDERGROUND VIBRATOR

[75] Inventor: Delbert W. Fair, Ponca City, Okla.

[73] Assignee: Conoco Inc., Ponca City, Okla.

[21] Appl. No.: 212,938

[22] Filed: Dec. 4, 1980

[51] Int. Cl.³ .................... G01V 1/145; G01V 1/053
[52] U.S. Cl. ............................. 181/121; 181/120; 367/143; 73/671
[58] Field of Search ............... 367/143; 181/106, 110, 181/120, 121; 124/73; 73/663, 671

[56] References Cited

U.S. PATENT DOCUMENTS

| | | | |
|---|---|---|---|
| 3,205,969 | 9/1965 | Clark | 181/0.5 |
| 3,369,518 | 2/1968 | Bricout | 367/143 |
| 3,372,770 | 3/1968 | Clynch | 181/121 |
| 3,376,949 | 4/1968 | Baher et al. | 181/120 |
| 3,718,206 | 2/1973 | Baff et al. | 181/114 |
| 3,764,965 | 10/1973 | McLeen et al. | 367/143 |
| 4,042,063 | 8/1977 | Waters | 367/75 |
| 4,135,599 | 1/1979 | Fair | 181/121 |
| 4,143,736 | 3/1979 | Fair | 367/75 |
| 4,207,961 | 6/1980 | Kitsunezaki | 181/106 |
| 4,219,096 | 8/1980 | Airhart | 181/402 |

FOREIGN PATENT DOCUMENTS

| | | | |
|---|---|---|---|
| 16725 | of 1913 | United Kingdom | 367/143 |
| 748310 | 7/1980 | U.S.S.R. | 181/401 |

*Primary Examiner*—Nelson Moskowitz
*Attorney, Agent, or Firm*—William J. Miller

[57] ABSTRACT

A hydraulic drive system for an underwater vibrator has a hydraulically driven mass for generating a seismic wave into the seabed. The hydraulic drive system for the vibrator is accomplished by filtering sea water, conveying the filtered sea water to the hydraulic pump where the sea water under pressure is supplied through a control valve to the hydraulic vibrator. The output from the control valve is coupled to the sea water. The hydraulic system provides hydraulic fluid which will not need to be cooled, thereby eliminating the normal cooling system along with several necessary accumulators and sump which are used in a closed hydraulic system.

4 Claims, 1 Drawing Figure

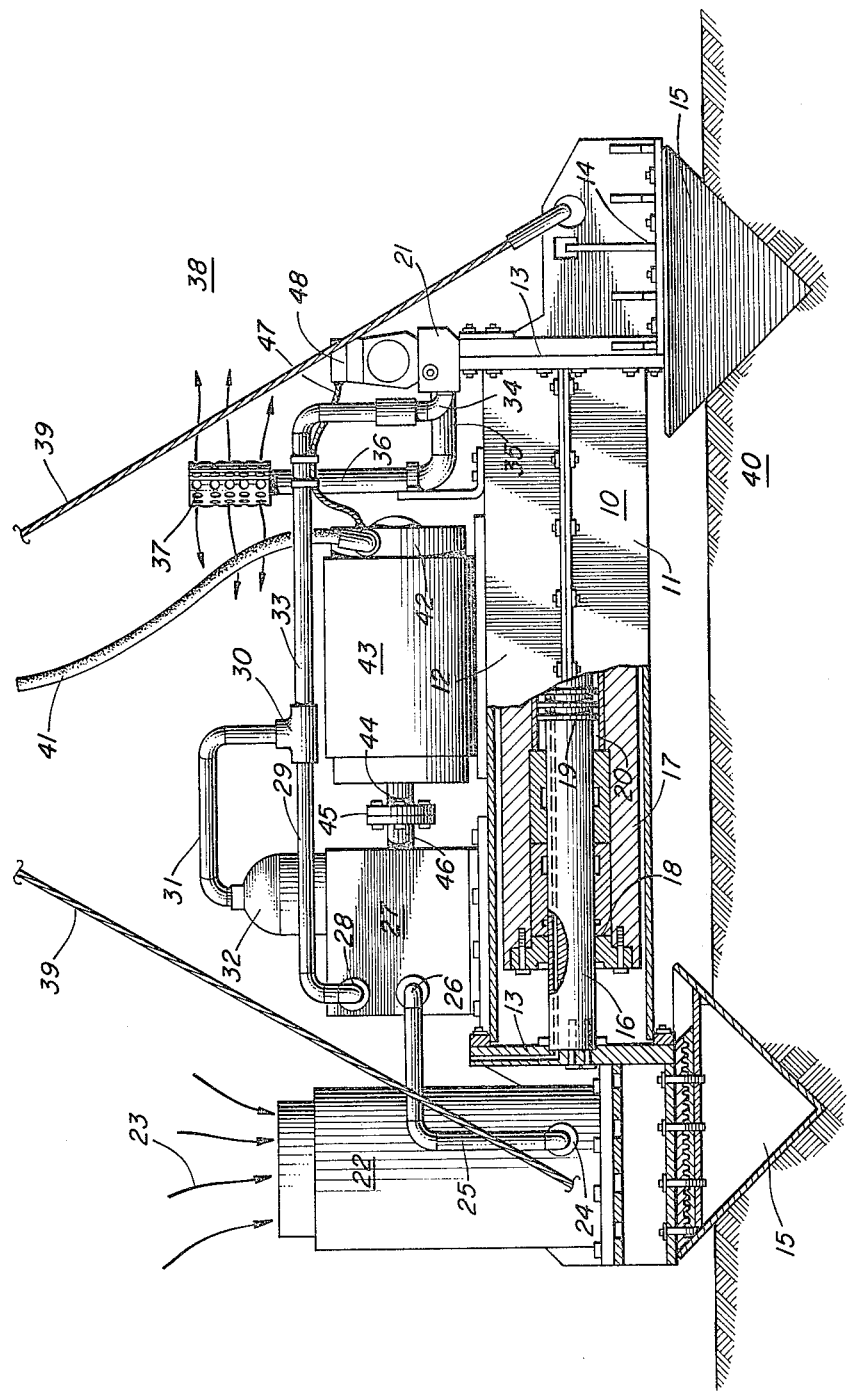

SEA WATER HYDRAULIC FLUID SYSTEM FOR AN UNDERGROUND VIBRATOR

DISCUSSION OF THE PRIOR ART

Shear wave vibrators are well known as exemplified by U.S. Pat. No. 4,135,599 issued Jan. 23, 1979, to Delbert W. Fair. In the past shear wave vibrators of the type described in U.S. Pat. No. 4,135,599 have been operated by a hydraulic source, such as, for example, a hydraulic fluid reservoir which is connected to a hydraulic pump, which hydraulic pump increases the pressure of the fluid to that required for the hydraulic pistons which operate the shear wave vibrator. The fluid is communicated from the hydraulic pump to the control valves which are connected to the shear wave vibrator. The control valves exhaust into a sump. Normally, several accumulators are necessary on the input and output of the various hydraulic connections to prevent cavitation and other undesirable effects associated with the hydraulic system. In the case of an underwater shear wave vibrator, two alternatives are available to generate the hydraulic fluid necessary to operate the vibrator. One method to be to convey the fluids down a long extended pipe to the hydraulic control valve, and the second method would be to have the hydraulic power supply at the shear wave vibrator with the hydraulic pump being driven by an electrical motor which receives power from the surface. Such an apparatus, of course, requires hydraulic oil cooling equipment on the vibrator, and all the necessary apparatus including reservoirs and accumulators which are necessary to have a properly operating hydraulic system. U.S. Pat. No. 3,205,969 describes a hydraulic system where water is taken through a filter into a hydraulic motor and then sent to a sink where the material from the sink is pumped out back to the water. U.S. Pat. No. 3,205,969 does not describe or refer to an underwater vibrator but does teach utilization of water to operate a hydraulic motor which functions by a differential pressure created by movement of the objects carrying the device above described. No patent known to Applicant teaches the utilization of the sea water as the source of hydraulic fluid to operate the vibrator itself.

BRIEF DESCRIPTION OF THE INVENTION

This invention contemplates the use of sea water as the main hydraulic source for operating the underwater shear wave vibrator. The water is drawn in through a filter and conveyed through a conduit to the hydraulic pump. The water leaves the hydraulic pump and is communicated to an accumulator and to the input or pressure port of the hydraulic control valve. The output or return port of the hydraulic control valve is coupled to the sea water. An electrical motor, receiving its power from a remote location such as a ship on the surface of the water, is coupled to and drives the hydraulic pumps. The control ports of the control valve are coupled in the usual manner to the pistons inside the mass of the hydraulic vibrator. Using a proper control signal the control valve will direct hydraulic fluid to one side or the other of the pistons causing the pistons to oscillate within the mass, transmitting force to the housing of the shear wave vibrator and through the coupling apparatus on the shear wave vibrator to the sea bed.

BRIEF DESCRIPTION OF THE FIGURE

FIG. 1 depicts the shear wave generator for underwater use.

DETAILED DESCRIPTION OF THE INVENTION

The shear wave vibrator illustrated in this invention is a standard shear wave vibrator fully described in U.S. Pat. No. 4,135,599 as previously discussed. Basically, the vibrator comprises a housing 10 which includes a lower half 11, an upper half 12, and end plates 13. A bracket 14 is connected to end plate 13 and coupled to ground engaging means 15 to the vibrator. Ground engaging means 15 is of a wedge or pyramidal-type construction and provides anchoring of the vibrator to the seabed during operation. Inside housing 10 is a pair of shafts 16 mounted horizontally between end plates 13 (the second shaft is not illustrated in the FIGURE). Shaft 16 passes through a mass 17 and is hydraulically sealed at 18 to prevent the escape of hydraulic fluids into the housing. Shaft 16 contains pistons 19 which are confined in a cylinder 20 in mass 17. Hydraulic passageways are coupled from each side of piston 19 to control valve 21. The hydraulic system of this invention essentially is comprised of a filter 22 which has a water inlet as illustrated by arrows 23 and an outlet 24 which is coupled by a conduit 25 to the inlet 26 of a hydraulic pump 27. An outlet 28 of hydraulic pump 27 is connected by a conduit 29 to a "T" connection 30. One branch of the "T" is coupled by a conduit 31 to an accumulator 32 while the remaining branch of 30 is coupled through a conduit 33 to the inlet 34 of control valve 21. The outlet 35 of control valve 20 is coupled through conduit 36 to an outlet 37 which exhausts into the sea water generally referred to by number 38. The entire vibrator is supported by its cable means 39 which may be coupled to a single cable or a plurality of cables (not illustrated in the FIGURE). Seabed engaging means 15, when the vibrator is in operation, will normally be coupled to and engaging the seabed 40. A cable 41 is connected between an electrical power supply at the surface of the water from a surface vessel, such as a boat, which is not illustrated, and a terminal box 42. A motor 43 has its input connected to cable 41 in order to receive adequate power for driving motor 43 and its mechanical output connected through a shaft 44, a coupler 45, to a second shaft 46 which drives hydraulic pump 27. Also in the terminal box will be a wire 47 which contains the control signals necessary to operate control valve 31, therefore, wire 47 is connected to the input 48 of control valve 21. Cable 41 may also contain a conduit for bringing air pressure down to the vibrator and other signals from the vibrator to the surface. The air may be used for pressurizing the internals of the vibrator to maintain the vibrator at a higher pressure than the outside sea water so that sea water will not seep into the vibrator housing and hinder the operation of movement of the vibrator housing about mass 17. Furthermore, sensors may be necessary which have not been illustrated but are well known in the art which would transmit air pressure readings inside the vibrator to the surface and any other necessary signals which need to be transmitted from the vibrator to the surface for proper control of the vibrating and seismic surveying system.

OPERATION

Operation of the vibrator is similar to any shear wave vibrator either on land or on the sea with the exception of the unique functions described in this invention. Basically, the cables 39 will lift the vibrator and deposit it at some particular location on seabed 40 where signals are desired to be transmitted onto the ground,. Once the vibrator is positioned, electricity will be supplied down cable 41 along with the necessary signals to control the operation of the vibrator. When power is supplied to motor 43, shaft 44 through coupler 45 will turn shaft 46 operating pump 27. Once pump 27 begins to rotate, fluid will be taken in to the inlet of filter 22 in the direction as indicated by arrows 23. Water will then be forced from outlet 24 through conduit 25 to the inlet 26 of pump 27 where the water will be pressurized to the outlet 28 through conduit 29 and 33 to the inlet 34 of control valve 21. Water will, of course, also be supplied through conduit 31 to accumulator 32. When it is desired to operate the vibrator once the system is pressurized, a control signal will be sent down cable 41 which may be transmitted through wire 47 to control to the input 48 of control valve 21. Once the signal is received at control valve 21, hydraulic fluid will be passed from conduit 34 to appropriate control valves and ports and passageways to one side or the other side of piston 19. Once one side of the piston 19 is pressured up, the housing will tend to move about mass 17, causing a force to be exhibited against one side or the other of seabed engaging means 15. Upon proper control to the input 48 of control valve 21, the fluid will gradually be decreased on one side and pressured on the other side of piston 19, causing the housing to move in the reverse direction, therefore, the signal being received at 48, upon proper control, will develop a vibrating signal which will be coupled to the seabed engaging means 15 and be transmitted into seabed 40. When the hydraulic fluid is being expelled from control valve 21, it will pass through conduits 35 and 36 to the outlet 37. The outlet 37 is shown being covered so that material cannot drop into the outlet pipe, thereby contaminating the control valve 21.

The invention basically provides a source of hydraulic fluid which can operate a large undersea vibrator without requiring an extraordinary amount of apparatus normally required to operate a hydraulic vibrator, such as an oil cooler, oil reservoir, accumulators on the inputs and outputs on all of the hydraulic use devices.

Using the sea water as the hydraulic fluid also eliminates possible contamination of the sea with hydraulic oil. In a vibrator which would normally develop 3,000-foot pounds of force, the electric motor 43 would have approximately 200 horsepower and hydraulic pump 27 would develop 3,000 pounds per square inch at 100 gallons per minute.

CONCLUSIONS

An extremely efficient undersea vibrator has been disclosed which utilizes the sea water as the main hydraulic fluid for operating a high force vibrator. The use of sea water rather than a contained hydraulic fluid reservoir provides several unique advantages in the elimination of a large amount of waste, the elimination of oil coolers, accumulators, and other necessary equipment normally associated with a self-contained hydraulic system. It is obvious that rather than a single pump, dual pumps can be used, dual motors and other modifications can be made in the above system as described. It is obvious that changes can be made in the application and still be within the spirit and scope of the invention as disclosed in the specification and appended claims.

What is claimed is:

1. A hydraulic drive system for an underwater vibrator having a housing including a top, sidewall means, and a bottom; seabed engaging means attached to said bottom; positioning means coupled to said housing; vibratory means including a mass member which has pistons and cylinder means, inside said housing with said piston rods extending outside said mass and attached to the inside of said housing; and hydraulic drive means including a hydraulic fluid pump which has an inlet port and an outlet port; a motor means coupled to drive said hydraulic fluid pump; a control valve having an inlet port, an outlet port, and a control signal input, said hydraulic drive system comprising a filter having an inlet adapted for communication with said water; conduit means coupled from the outlet port of said filter to the inlet port of said fluid pump; a conduit coupled from said outlet port of said fluid pump to the inlet port of said control valve; and means, coupled to the outlet port of said control valve which is adapted to exhaust the outlet port from said control valve to said water, whereby fluid sucked into said filter will be substantially cleared of particulate matter, compressed by said fluid pump, controllably applied to said pistoncylinder combination through said control valve and exhausted from said control valve to said water, thereby eliminating most of the accumulator, fluid coolers, and sump necessary for a confined hydraulic system.

2. A system as described in claim 1 includes an accumulator in fluid communication with the conduit coupled from the outlet port of said fluid pump to the inlet port of said control valve.

3. A system as described in claim 1 or 2 where means coupled to said outlet of said control valve comprises a conduit coupled to a screen to prevent material from entering the outlet conduit.

4. Apparatus as described in claim 1 where said vibrator mass is mounted horizontally to generate a shear wave into the seabed.

* * * * *